(12) United States Patent
Sakai

(10) Patent No.: US 11,849,096 B2
(45) Date of Patent: Dec. 19, 2023

(54) PRINTER FOR TWO-COLOR COPYING

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/812,463

(22) Filed: Jul. 14, 2022

(65) Prior Publication Data

US 2023/0019955 A1  Jan. 19, 2023

(30) Foreign Application Priority Data

Jul. 16, 2021 (JP) ................................. 2021-117683

(51) Int. Cl.
*H04N 1/60* (2006.01)
*H04N 1/50* (2006.01)

(52) U.S. Cl.
CPC ............ *H04N 1/6063* (2013.01); *H04N 1/50* (2013.01)

(58) Field of Classification Search
CPC ...... H04N 1/6063; H04N 1/50; H04N 1/6016; H04N 1/40012
See application file for complete search history.

(56) References Cited

U.S. PATENT DOCUMENTS

| 5,237,517 | A  | * | 8/1993  | Harrington | G01D 15/00 382/162 |
| 5,740,333 | A  | * | 4/1998  | Yoh | H04N 1/56 358/529 |
| 7,782,491 | B2 | * | 8/2010  | Ishizuka | H04N 1/56 382/163 |
| 9,350,901 | B2 | * | 5/2016  | Kumagai | H04N 1/46 |
| 2003/0002060 | A1 | * | 1/2003  | Yokoyama | H04N 1/56 358/1.9 |
| 2004/0239969 | A1 | * | 12/2004 | Shoda | H04N 1/56 358/1.9 |
| 2005/0062987 | A1 | * | 3/2005  | Hashimoto | H04N 1/56 358/1.9 |
| 2005/0062990 | A1 | * | 3/2005  | Fujishige | H04N 1/56 358/1.9 |
| 2007/0070463 | A1 | * | 3/2007  | Moro | H04N 1/46 358/1.13 |
| 2007/0109573 | A1 | * | 5/2007  | Hirayama | H04N 1/56 358/1.13 |
| 2008/0068628 | A1 | * | 3/2008  | Dokuni | H04N 1/465 358/1.9 |

(Continued)

FOREIGN PATENT DOCUMENTS

| JP | 2004090646 | A | * | 3/2004 |
| JP | 2005229336 | A | * | 8/2005 |

(Continued)

*Primary Examiner* — Ted W Barnes
(74) *Attorney, Agent, or Firm* — Global IP Counselors, LLP

(57) ABSTRACT

A printing system includes: a scanner configured to scan a document to generate a document image; a determination section configured to automatically determine a first color in accordance with a situation; a specification section configured to cause a user to specify a color with recommendation of the first color; and a print section configured to perform two-color copying on a medium by using a color specified by the specification section.

9 Claims, 11 Drawing Sheets

(56) References Cited

U.S. PATENT DOCUMENTS

| | | | | |
|---|---|---|---|---|
| 2008/0181628 A1* | 7/2008 | Ahn | H04N 1/6022 | 399/27 |
| 2008/0231903 A1* | 9/2008 | Misawa | H04N 1/40012 | 358/1.9 |
| 2009/0185205 A1* | 7/2009 | Nakajima | H04N 1/626 | 358/1.9 |
| 2010/0290067 A1* | 11/2010 | Miyake | H04N 1/6072 | 358/1.9 |
| 2011/0038011 A1* | 2/2011 | Kimura | G06K 15/02 | 358/3.24 |
| 2011/0069325 A1* | 3/2011 | Kawashima | H04N 1/603 | 358/1.1 |
| 2011/0102867 A1* | 5/2011 | Ohira | H04N 1/00344 | 358/504 |
| 2011/0102869 A1* | 5/2011 | Hirayama | H04N 1/40012 | 358/518 |
| 2011/0141500 A1* | 6/2011 | Togami | H04N 1/56 | 358/1.9 |
| 2011/0141501 A1* | 6/2011 | Shirata | H04N 1/60 | 358/1.9 |
| 2011/0181648 A1* | 7/2011 | Yoneoka | H04N 1/6022 | 347/15 |
| 2011/0205566 A1* | 8/2011 | Aritomi | H04N 1/387 | 358/1.9 |
| 2011/0286667 A1* | 11/2011 | Hayashi | H04N 1/644 | 382/167 |
| 2012/0170844 A1* | 7/2012 | Suzuki | H04N 1/6075 | 382/167 |
| 2013/0100469 A1* | 4/2013 | Nagai | H04N 1/6075 | 358/1.9 |
| 2015/0043018 A1* | 2/2015 | Tanimoto | H04N 1/60 | 358/1.9 |
| 2015/0178606 A1* | 6/2015 | Nakashio | H04N 1/54 | 358/1.9 |
| 2016/0059577 A1* | 3/2016 | Horikoshi | G06F 3/1273 | 347/6 |
| 2016/0112605 A1* | 4/2016 | Manda | H04N 1/62 | 358/520 |
| 2020/0105027 A1* | 4/2020 | Kobayashi | H04N 1/4095 | |
| 2020/0137265 A1* | 4/2020 | Nakashio | H04N 1/6075 | |
| 2020/0150912 A1* | 5/2020 | Ogawa | G06F 3/1239 | |
| 2020/0314286 A1* | 10/2020 | Aizono | H04N 1/2369 | |
| 2021/0132875 A1* | 5/2021 | Harada | G06F 3/1208 | |
| 2021/0365218 A1* | 11/2021 | Sutherland | G06F 3/04842 | |

FOREIGN PATENT DOCUMENTS

| | | | |
|---|---|---|---|
| JP | 2007013724 A | * | 1/2007 |
| JP | 2007300631 A | * | 11/2007 |
| JP | 2012142830 A | * | 7/2012 |
| JP | 2020-057843 A | | 4/2020 |
| JP | 2020057843 A | * | 4/2020 |

* cited by examiner

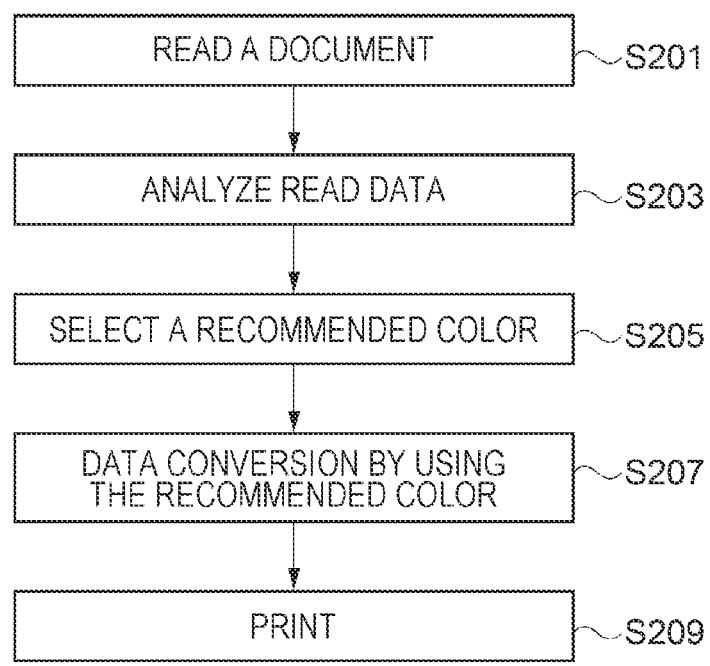

PRINTER FOR TWO-COLOR COPYING

The present application is based on, and claims priority from JP Application Serial Number 2021-117683, filed Jul. 16, 2021, the disclosure of which is hereby incorporated by reference herein in its entirety.

BACKGROUND

1. Technical Field

The present disclosure relates to a printer.

2. Related Art

In printers and copying machines, full color printing using the four colors of CMYK is commonly performed. However, full color printing needs color materials of four colors, and thus tends to increase cost. In order to save cost, two-color copying, which reduces the number of colors for printing, is gathering attention. In the two-color copying described in JP-A-2020-057843, a first color in a color document is printed by using a black color material and a second color is printed by using a user-specified color.

In the two-color copying described in JP-A-2020-057843, a user specifies one color out of the two colors. Accordingly, it is necessary for the user to select a color to specify the color at the time of setting, and this is a troublesome task.

SUMMARY

According to an aspect of the present disclosure, there is provided a printing system including: a scanner configured to scan a document to generate a document image; a determination section configured to automatically determine a first color in accordance with a situation; a specification section configured to cause a user to specify a color with recommendation of the first color; and a print section configured to perform two-color copying on a medium by using a color specified by the specification section.

BRIEF DESCRIPTION OF THE DRAWINGS

FIG. 11 is a flowchart illustrating the operation of the printer.

DESCRIPTION OF EXEMPLARY EMBODIMENTS

Figure 1:
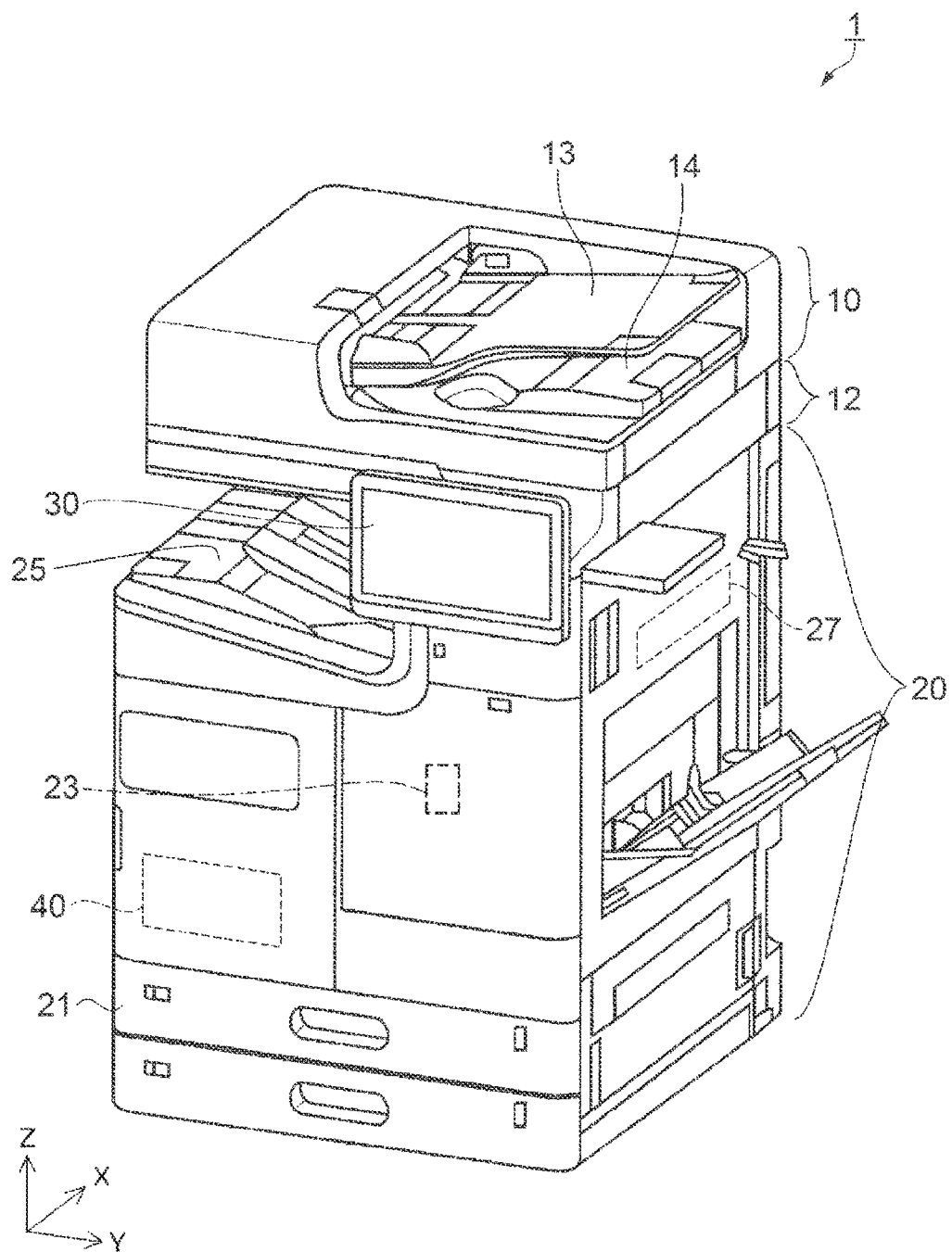
FIG. 1 is a diagram illustrating an outline of a printer.

FIG. 1 is a perspective view illustrating an outline of a printer 1. The printer 1 corresponds to an example of the printer. The printer 1 includes a reading unit 10 that reads a document, a print unit 20 that performs printing, and a display 30. The printer 1 has a print function that performs printing on a medium and a duplication function that reads a document and prints the read data on the medium. The printer 1 may have a scan function that reads a document, generates read data, and saves the read data, and a fax function that performs fax transmission of read data or externally received data. The fax function has a function of receiving fax data from the outside. The printer 1 may have a data transmission function that transmits read data or data received from the outside to an external device. The printer 1 may have a call function that makes a call and an e-mail function that transmits an e-mail. The read data corresponds to an example of the document image.

The reading unit 10 is mounted on a reading-unit mounting table 12. The reading unit 10 includes a mounting tray 13 on which a document is mounted and a document discharge tray 14 on which a document transported on a transport path is discharged. The reading unit 10 transports a document mounted on the mounting tray 13 to the document discharge tray 14 along the transport path. The transport path of the reading unit 10 is provided with a reading sensor not illustrated in the figure. The reading unit 10 scans the document to generate read data. The reading unit 10 corresponds to an example of the scanner.

The print unit 20 includes a paper feed cassette 21 on which a medium is mounted, a printing mechanism 23, a printed material discharge tray 25 on which a medium printed by the printing mechanism 23 is discharged, a processor 27 that performs various kinds of control, and a storage device 40. The printing mechanism 23 according to the present embodiment is an ink jet recording head that discharges ink onto the medium to perform recording. However, a mechanism other than an ink jet recording head, such as a mechanism of a sublimation method, a laser method, or the like may be used. The print unit 20 performs printing using print data based on the read data produced by reading a document to duplicate the document. The print unit 20 corresponds to an example of the print section.

The printing mechanism 23 according to the present embodiment includes a cyan ink tank storing cyan ink, which is not illustrated in FIG. 1, a magenta ink tank storing magenta ink, a yellow ink tank storing yellow ink, and a black ink tank storing black ink. Each ink tank includes a sensor that detects the ink amount, which is not illustrated in FIG. 1. The print unit 20 detects the storage amount of the ink stored in each ink tank, and transmits the storage amount to a storage device 40 described later. The storage device 40 stores the storage amount of each transmitted ink. In this regard, each ink tank may not include a sensor that detects the ink amount, and a control unit 50 described later may subtract the used ink amount from the initial ink amount of a corresponding ink tank to calculate the storage amount of ink stored in each ink tank and store the calculated storage amount. The storage amount of the ink corresponds to the remaining amount of each color material. Also, when the available amount of ink allowed for the user is set separately from the physical amount of ink that actually remains, the remaining available amount of ink allowed for the user corresponds to the remaining amount of each color material.

The print unit 20 performs color printing that prints a color image on a medium, monochrome printing that prints a black image on a medium, gray printing that prints a gray image on a medium, and two-color printing that prints a two-color image on a medium.

The print unit 20 may include a post-processing mechanism not illustrated in FIG. 1. The post-processing mechanism performs various kinds of processing on the printed material printed by the print unit 20. The processing executed by the post-processing mechanism includes staple processing that binds a plurality of printed materials by using a staple, or the like, punch processing that punches a printed material, folding processing that folds a printed material in two, or the like, and shift processing that shifts a plurality of printed materials for each copy and discharges the copy, or the like. The post-processing mechanism performs one or more kinds of processing among these kinds of processing.

The display 30 displays an execution screen for causing the printer 1 to execute operation and an operation screen, such as a setting screen on which each function of the printer 1 is set, or the like based on display data. The display 30 receives display data via an input/output interface 70 described later. The display 30 may be a touch panel that receives a touch operation input by a user. The printer 1 illustrated in FIG. 1 includes the display 30. However, the present disclosure is not limited to this. The display 30 may be an external unit coupled to the printer 1.

The printer 1 performs duplication that prints data read by the reading unit 10 using the print unit 20. The printer 1 performs, using the read data, color copying that performs color printing on a medium, monochrome copying that performs monochrome printing on a medium, gray copying that performs gray printing on a medium, and two-color duplication that performs two-color printing on a medium. Hereinafter, duplication is sometimes referred to as copying.

Figure 2:
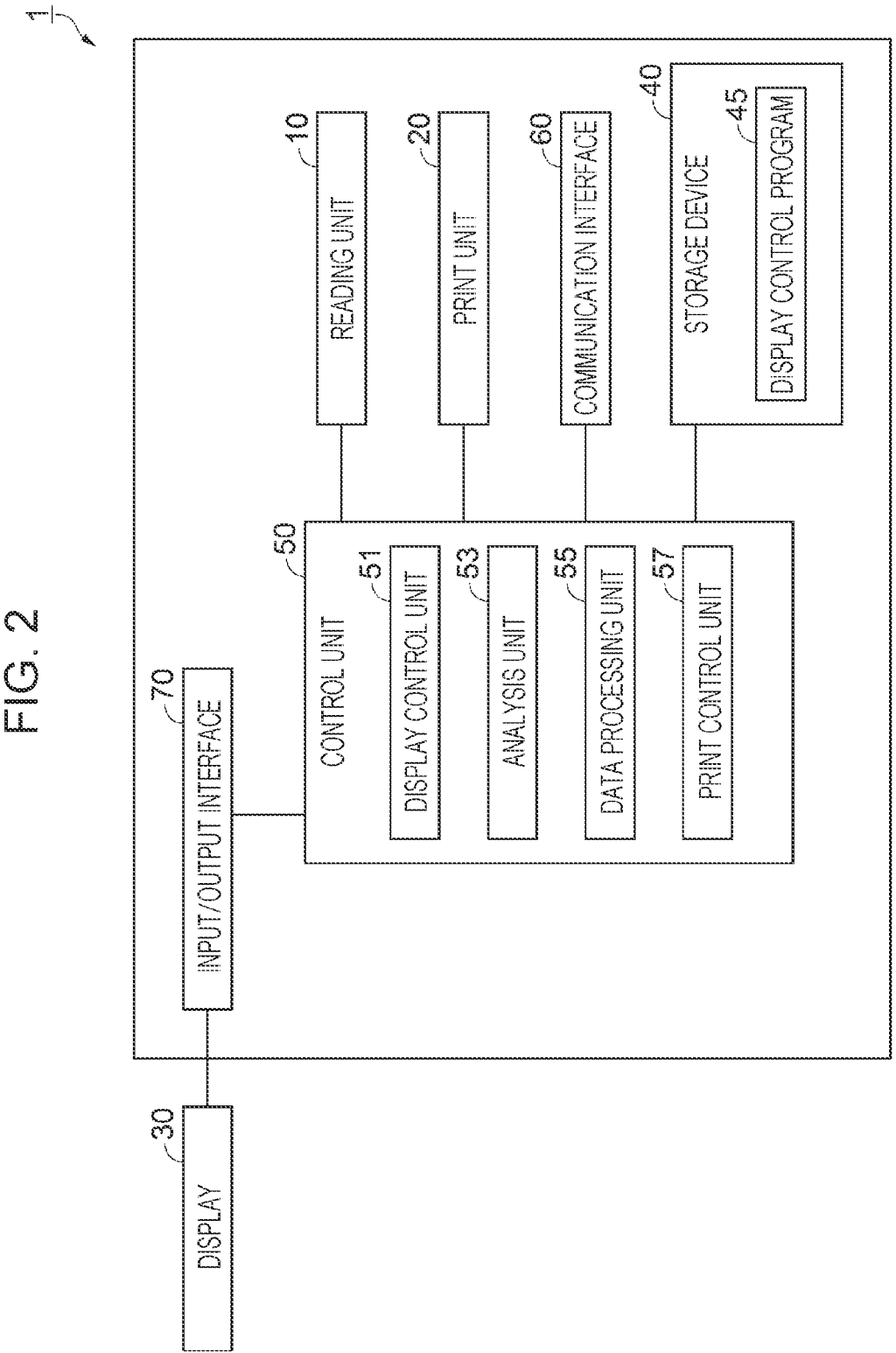
FIG. 2 is a diagram illustrating functional blocks of the printer.

FIG. 2 illustrates the functional blocks of the printer 1. The functional blocks in FIG. 2 illustrate the case in which an external display 30 is coupled to the printer 1. The printer 1 includes a reading unit 10, a print unit 20, a storage device 40, a control unit 50, a communication interface 60, and an input/output interface 70. The display 30 is coupled to the printer 1.

The display 30 includes a panel, such as a liquid crystal panel, an organic EL (electro-luminescence) panel, or the like, and displays an operation screen based on display data. The display 30 may be a touch panel including a touch sensor not illustrated in FIG. 2. The touch sensor detects various touch operations input by a user. The display 30 receives various kinds of display data from the printer 1 and displays data based on the received display data. The display 30 corresponds to an example of the display section.

The storage device 40 stores various programs, such as a read control program that controls the operation of the reading unit 10, a print control program that controls the operation of the print unit 20, and a display control program 45 that controls the display of the display 30. The print control program includes a printer driver that converts read data to print data. The print control program causes the processor 27 to operate as a conversion section that converts read data to print data. These programs may be constituted by one or more packages. The storage device 40 stores various data including print data and various settings set by using the setting screen. The print data indicates data that the printer 1 uses for printing and includes data in a file format, such as PDF or the like, a print job transmitted from a printer driver of an external device, and the like. The display control program 45 causes the processor 27 to operate as a display control section that controls various displays on the display 30, and as an analysis section that analyzes read data, and the like. The display control program 45 corresponds to an example of the program.

The storage device 40 stores the storage amount of each ink tank transmitted from the print unit 20. The storage device 40 stores the storage amount of the cyan ink stored in the cyan ink tank, the storage amount of the magenta ink stored in the magenta ink tank, the storage amount of the yellow ink stored in the yellow ink tank, and the storage amount of the black ink stored in the black ink tank. The cyan ink, the magenta ink, the yellow ink, and the black ink are examples of the color materials. The cyan toner, the magenta toner, the yellow toner, and the black toner are also examples of the color materials.

The storage device 40 is constituted by a semiconductor memory element, such as a flash ROM (read-only memory) or the like or other types of a nonvolatile storage device. The storage device 40 may include a RAM (random access memory) serving as a work area. The storage device 40 may include a magnetic storage device, such as an HDD (hard disk drive) or the like, a semiconductor storage device, such as a SSD (solid state drive) or the like. The storage device 40 corresponds to an example of the storage section.

The control unit 50 controls each section of the printer 1. The control unit 50 is a controller including the processor 27 illustrated in FIG. 1. The controller corresponds to an example of the computer. The control unit 50 executes various programs stored in the storage device 40. The control unit 50 transmits or receives various kinds of data via an input/output interface 70 described later. The data received via the input/output interface 70 includes an instruction from a user. The control unit 50 controls the reading unit 10, the print unit 20, the display 30, the storage device 40, the communication interface 60, and the input/output interface 70 based on the instruction received from the user. The control unit 50 corresponds to an example of the control section.

The control unit 50 includes a display control unit 51, an analysis unit 53, a data processing unit 55, and a print control unit 57. The display control unit 51 is a functional section realized by executing the display control program 45 by the control unit 50. The display control unit 51 generates display data to be transmitted to the display 30. The display control unit 51 transmits the generated display data to the display 30 and controls the display of the display 30. The display control unit 51 receives various instructions from the user via the input/output interface 70. The display control unit 51 generates setting screen data for displaying a setting screen for causing the user to input various settings as display data on the display 30. The setting screen includes a screen, described later, that causes the user to specify a color. The display control unit 51 causes the display 30 to display a setting screen so as to cause the user to specify a color. The display control unit 51 corresponds to an example of the specification section. The setting screen data is the display data for displaying a setting screen on the display 30.

The analysis unit 53 is a functional section that is realized by executing the display control program 45 performed by the control unit 50. The analysis unit 53 analyzes read data. The analysis unit 53 analyzes, for example, color information included in the read data. The analysis unit 53 analyzes, as color information, the color components included in the read data, and the contained amount for each color component. The color components included in the read data correspond to examples of colors included in the document image. The analysis unit 53 may analyze color components included in the read data for each element of red, green, and blue in the RGB color space. The analysis unit 53 may analyze the four components of cyan, magenta, yellow, and black in the CMYK color space. The analysis unit 53 may perform analysis by using a predetermined plurality of colors as color components. As an example, the analysis unit 53 sets red, blue, green, yellow, and the like as a predetermined plurality of colors and analyzes the contained amount for each color as the color components. The read data may be data when one document is read, or may be data when a plurality of documents are read. The analysis unit 53 may analyze not only the read data but also the print data transmitted from an external device not illustrated in FIG. 2. It is possible for the analysis unit 53 to perform various kinds of processing, such as background removal processing or the like on the read data and the print data.

The analysis unit 53 analyzes color information based on the settings of color printing, monochrome printing, gray printing, and two-color printing. When the two-color printing is set, the analysis unit 53 determines one or two recommended colors as a result of analysis performed on the color information. The recommended colors are colors determined based on the analysis result performed by the analysis unit 53, and the colors for two-color printing to be presented by the printer 1 to the user. The recommended color corresponds to an example of the first color. When the read data is used for performing two-color printing, the analysis unit 53 automatically determines the colors easy for the user to determine, the colors having a high use frequency, or the like as the recommended colors.

The analysis unit 53 may determine a recommended color based on various kinds of data obtained from a print control unit 57 described later. The analysis unit 53 obtains the ink amount information indicating the difference in the ink storage amount from the print control unit 57. The analysis unit 53 determines a recommended color based on the obtained ink amount information. As an example, the analysis unit 53 determines the ink having the largest ink storage amount as a recommended color based on the ink amount information. When the ink having the largest ink storage amount is magenta ink, the analysis unit 53 determines red as the recommended color. The analysis unit 53 may determine the color generated by the magenta ink as a recommended color. The analysis unit 53 determines a recommended color in accordance with a situation. The analysis unit 53 corresponds to an example of the determination section.

The data processing unit 55 is a functional section realized by executing the print control program by the control unit 50. The data processing unit 55 converts the read data generated by the reading unit 10 to print data. The print data is data to be processed by the printing mechanism 23 of the print unit 20, and includes a print job temporarily stored in the storage device 40. The data processing unit 55 may convert the print data transmitted from an external device to data to be processed by the printing mechanism 23. The data processing unit 55 converts read data to print data individually corresponding to color printing, monochrome printing, gray printing, two-color printing, or the like. The data processing unit 55 may convert color print data to print data corresponding to monochrome printing, gray printing, two-color printing, or the like. The data processing unit 55 corresponds to an example of the conversion section. The print data corresponds to an example of the conversion data.

The print control unit 57 is a functional section realized by executing the print control program by the control unit 50. The print control unit 57 controls print unit 20 based on the various settings related to printing. As an example, the print control unit 57 causes the print unit 20 to perform two-color printing when two-color duplication is set. The print control unit 57 corresponds to an example of the print control section. The print control unit 57 obtains the storage amount of the ink stored in each ink tank of the print unit 20. The print control unit 57 obtains the cyan ink storage amount, the magenta ink storage amount, the yellow ink storage amount, and the black ink storage amount. The print control unit 57 calculates each difference of the cyan ink storage amount, the magenta ink storage amount, and the yellow ink storage amount. The print control unit 57 may calculate the difference of each ink storage amount including the black ink storage amount. The print control unit 57 outputs the calculated calculation result to the analysis unit 53. The calculation result indicates the ink color having the largest ink storage amount, the ink color having the smallest ink storage amount, and the ink color having the lowest use frequency, and the like. The print control unit 57 corresponds to an example of the calculation section.

The communication interface 60 communicates with an external device not illustrated in FIG. 2, receives print data, and the like from the external device, and transmits print data, and the like stored in the storage device 40 to the external device. The communication interface 60 and the external device are examples of a local area connection conforming to the Ethernet (registered trademark) standard. The local area connection may be a wired connection via a cable, or may be wireless connection conforming to the Ethernet standard, or the like. When the printer 1 has a fax function, the communication interface 60 establishes a fax communication connection with an external device. When the printer 1 is connected to an external server, such as a cloud server, a data server, or the like, the communication interface 60 establishes an internet connection with an external device via an internet communication network. When the communication interface 60 establishes a wireless connection via a Wi-Fi (registered trademark) communication connection, the communication interface 60 may establish a connection via a public wireless LAN line. The communication interface 60 corresponds to an example of the communication section.

The input/output interface 70 is coupled to the display 30, and transmits display data to the display 30. The input/output interface 70 is coupled to an input device not illustrated in FIG. 2 and receives input data indicating an instruction or the like from a user. The input device may be an operation panel included in the printer 1 or a mouse or the like coupled to the printer 1. When the display 30 includes a touch sensor, input data may be data detected by the touch sensor. The input/output interface 70 may include an input/output terminal coupled in a wired manner to a cable, such as a USB (Universal Serial Bus) cable, or the like, or a wireless communication element that performs proximity wireless communication, or the like.

Figure 3:
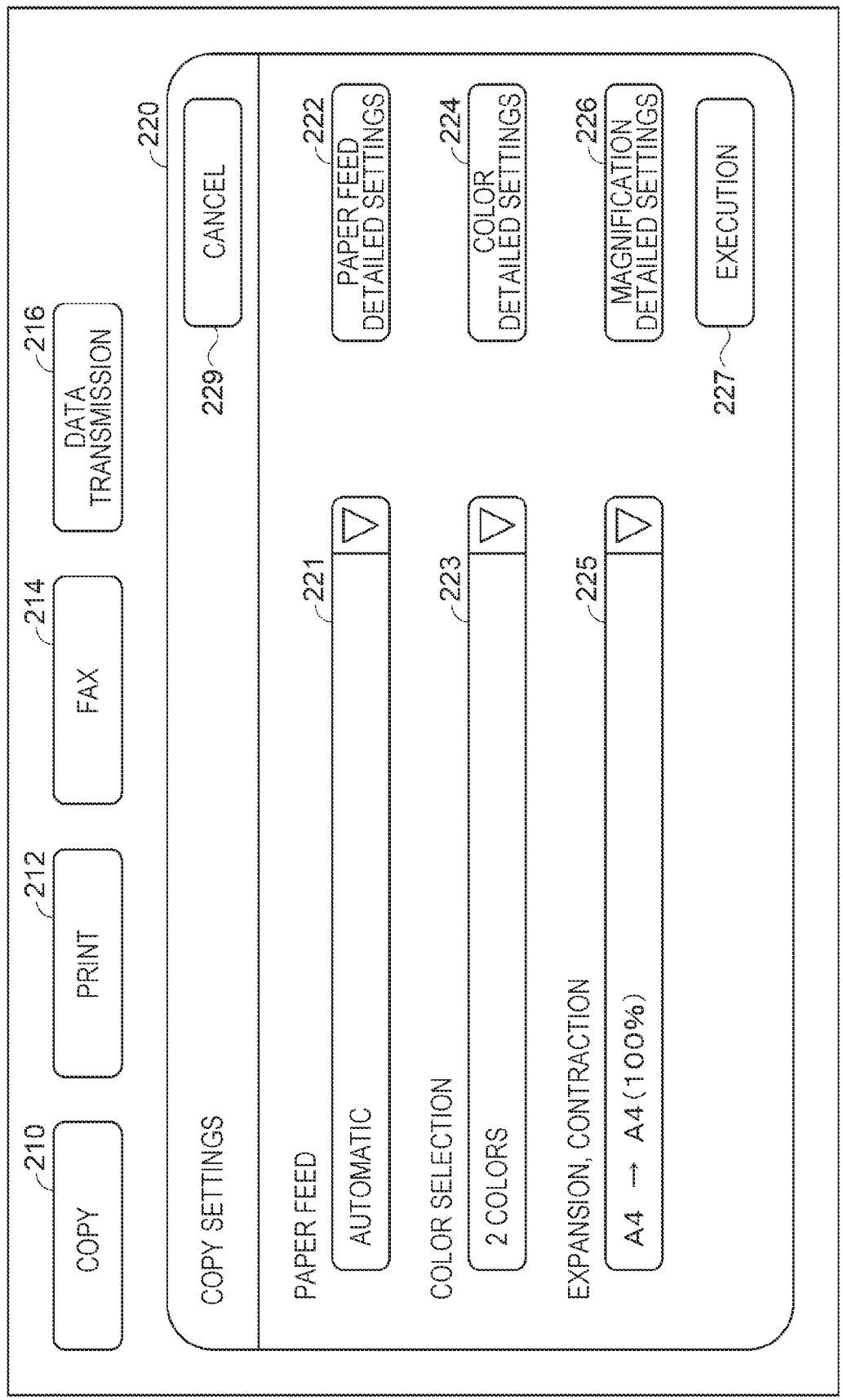
FIG. 3 is a diagram illustrating a copy setting screen.

FIG. 3 illustrates a copy setting screen 201, which is one of the setting screens. The copy setting screen 201 is displayed on the display 30. The display 30 displays the copy setting screen 201 based on the copy setting screen data received from the display control unit 51 illustrated in FIG. 2 via the input/output interface 70. The copy setting screen data is display data for displaying the copy setting screen 201 generated by the display control unit 51. The copy setting screen 201 illustrated in FIG. 3 is a screen displayed on the display 30 having a touch sensor.

The copy setting screen 201 displays a copy instruction button 210, a print instruction button 212, a fax instruction button 214, a data transmission instruction button 216, and a copy setting list 220. The copy setting list 220 displays a paper feed setting field 221, a paper feed detailed setting button 222, a color setting field 223, a color detailed setting button 224, a magnification setting field 225, a magnification detailed setting button 226, an execution button 227, and a cancel button 229. The copy instruction button 210, the print instruction button 212, the fax instruction button 214, and the data transmission instruction button 216 are headers that are displayed irrelevantly to the copy setting list 220.

The copy instruction button 210, the print instruction button 212, the fax instruction button 214, and the data transmission instruction button 216 are icons that receive input from a user. When the user performs touch operation on an icon, the display 30 receives input as an instruction from the user. The display 30 transmits an instruction received from the user to the control unit 50. The control unit 50 receives an instruction from the user from the display 30. When the display 30 does not include a touch sensor, the user operates an operation panel not illustrated in FIG. 3 to input an instruction on the operation panel. The operation panel receives an instruction from the user, and transmits the instruction to the control unit 50. The control unit 50 receives an instruction from the user from the operation panel.

The copy instruction button 210 receives input from the user. When the copy instruction button 210 receives input from the user, the control unit 50 receives a copy instruction of a document as an instruction from the user. When the control unit 50 receives a copy instruction of a document, the control unit 50 transmits the copy instruction to the display control unit 51. The display control unit 51 receives the copy instruction, and transmits copy setting screen data to the display 30. When the control unit 50 receives a copy instruction of a document, the control unit 50 may transmit the copy instruction of the document to the reading unit 10 and the print unit 20 and execute document copying.

The print instruction button 212 receives input from the user. When the print instruction button 212 receives input from the user, the control unit 50 receives a print instruction for the medium as the instruction from the user. When the control unit 50 receives a print instruction, the control unit 50 transmits the print instruction to the display control unit 51. The display control unit 51 receives the print instruction and transmits the print setting screen data containing the print setting to the display 30. When the control unit 50 receives a print instruction, the control unit 50 may transmit the print instruction to the print unit 20, and cause the print unit 20 to perform printing.

The fax instruction button 214 receives input from the user. When the fax instruction button 214 receives input from the user, the control unit 50 receives a fax transmission instruction as an instruction from the user. When the control unit 50 receives a fax transmission instruction, the control unit 50 transmits the fax transmission instruction to the display control unit 51. The display control unit 51 receives the fax transmission instruction and transmits fax setting screen data containing a fax transmission setting to the display 30. When the control unit 50 receives the fax transmission instruction, the control unit 50 may transmit the fax transmission instruction to the communication interface 60 and cause the fax transmission data to be transmitted. When the printer 1 does not include a fax function, the fax instruction button 214 is not displayed on the copy setting screen 201.

The data transmission instruction button 216 receives input from the user. When the data transmission instruction button 216 receives input from the user, the control unit 50 receives a transmission instruction instructing transmission of print data, or the like to the external device via the communication interface 60. When the control unit 50 receives a transmission instruction, the control unit 50 transmits the transmission instruction to the display control unit 51. The display control unit 51 receives the transmission instruction and transmits transmission setting screen data containing transmission settings to the display 30. When the control unit 50 receives the transmission instruction, the control unit 50 may transmit a transmission instruction to the communication interface 60 and cause data to be transmitted.

The paper feed setting field 221 displays the paper feed settings input by the user. The paper feed setting field 221 displays a selection result by the user regarding the paper feed cassette 21 of the print unit 20. The user selects a paper feed cassette 21 based on the size of the medium mounted on the paper feed cassette 21. Alternatively, when the printer 1 receives print data, the printer 1 selects a paper feed cassette 21 based on the size setting of the printed material included in the print data. When the user sets the selection of paper feed cassette 21 by the printer 1, the user inputs "automatic". The paper feed setting field 221 illustrated in FIG. 3 indicates the case in which the user has selected "automatic".

The paper feed detailed setting button 222 receives input from the user. When the paper feed detailed setting button 222 receives input from the user, the display control unit 51 receives a display instruction of a paper feed detailed setting screen as an instruction from the user based on the user input. A paper feed detailed setting screen is one of the paper feed detailed setting screens not illustrated in the figure, and receives paper feed settings not displayed in the paper feed setting field 221 regarding paper feed. The paper feed detailed setting screen is used when the user, for example, copies plural sizes of documents or the like and selects a plurality of paper feed cassettes 21.

The color setting field 223 displays the color setting input by the user. The color setting field 223 displays the color specification result by the user on the printing by the print unit 20. The user selects any one of full color, monochrome, gray, and two colors as the color specification, and the color setting field 223 displays the selection result by the user. The color setting field 223 illustrated in FIG. 3 indicates the case in which the user has selected "two colors".

The color detailed setting button 224 receives input from the user. When the color detailed setting button 224 receives input from the user, the display control unit 51 receives a display instruction of a color detailed setting screen as an instruction from the user based on the user input. The color detailed setting screen receives the detailed setting of color specification displayed in the color setting field 223. A description will be given later of the color detailed setting screen.

The magnification setting field 225 displays by the magnification input by the user. The magnification indicates magnification when the ratio of expansion or contraction when the print unit 20 performs printing on the medium. The magnification setting field 225 illustrated in FIG. 3 indicates that the magnification specified by the user input is 100%. A magnification of 100% indicates that printing is performed at a 1:1 ratio.

The magnification detailed setting button 226 receives input from the user. When the magnification detailed setting button 226 receives input from the user, the display control unit 51 receives a display instruction of the magnification detailed setting screen as an instruction from the user based on the user input. The magnification detailed setting screen is one of the setting screens not illustrated in FIG. 3 and receives the magnification setting not displayed in magnification setting field 225 regarding the magnification.

The execution button 227 receives input from the user. When the execution button 227 receives input from the user, the print control unit 57 receives an execution instruction as an instruction from the user. The print control unit 57 receives a copy execution instruction including various settings displayed on the copy setting screen 201 illustrated in FIG. 3. The copy setting screen 201 illustrated in FIG. 3 indicates the paper feed settings "automatic", the color settings "two colors", and the magnification setting "100%". The various settings received by the print control unit 57 based on the copy setting screen 201 in FIG. 3 are automatic setting of the paper feed cassette 21, two-color duplication, and 1:1 printing.

The cancel button 229 receives input from the user. When the cancel button 229 displayed on the copy setting screen 201 illustrated in FIG. 3 receives input from the user, the display control unit 51 receives a hide instruction that hides the copy setting list 220 as an instruction from the user, and a copy cancellation instruction. The cancel button 229 is displayed on not only the copy setting screen 201 but also the two-color copying setting screen 202 described later, and the like.

First Embodiment

Figure 4:
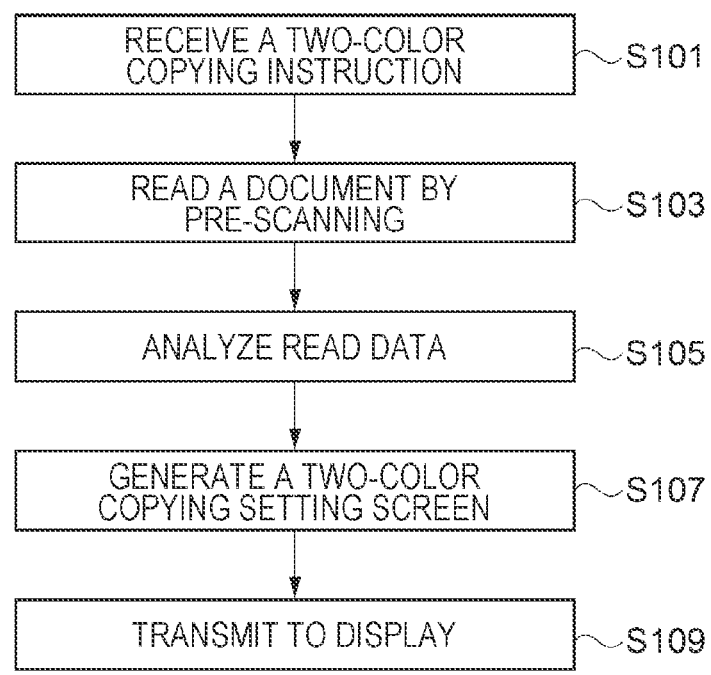
FIG. 4 is a flowchart illustrating the operation of the printer.
Figure 5:
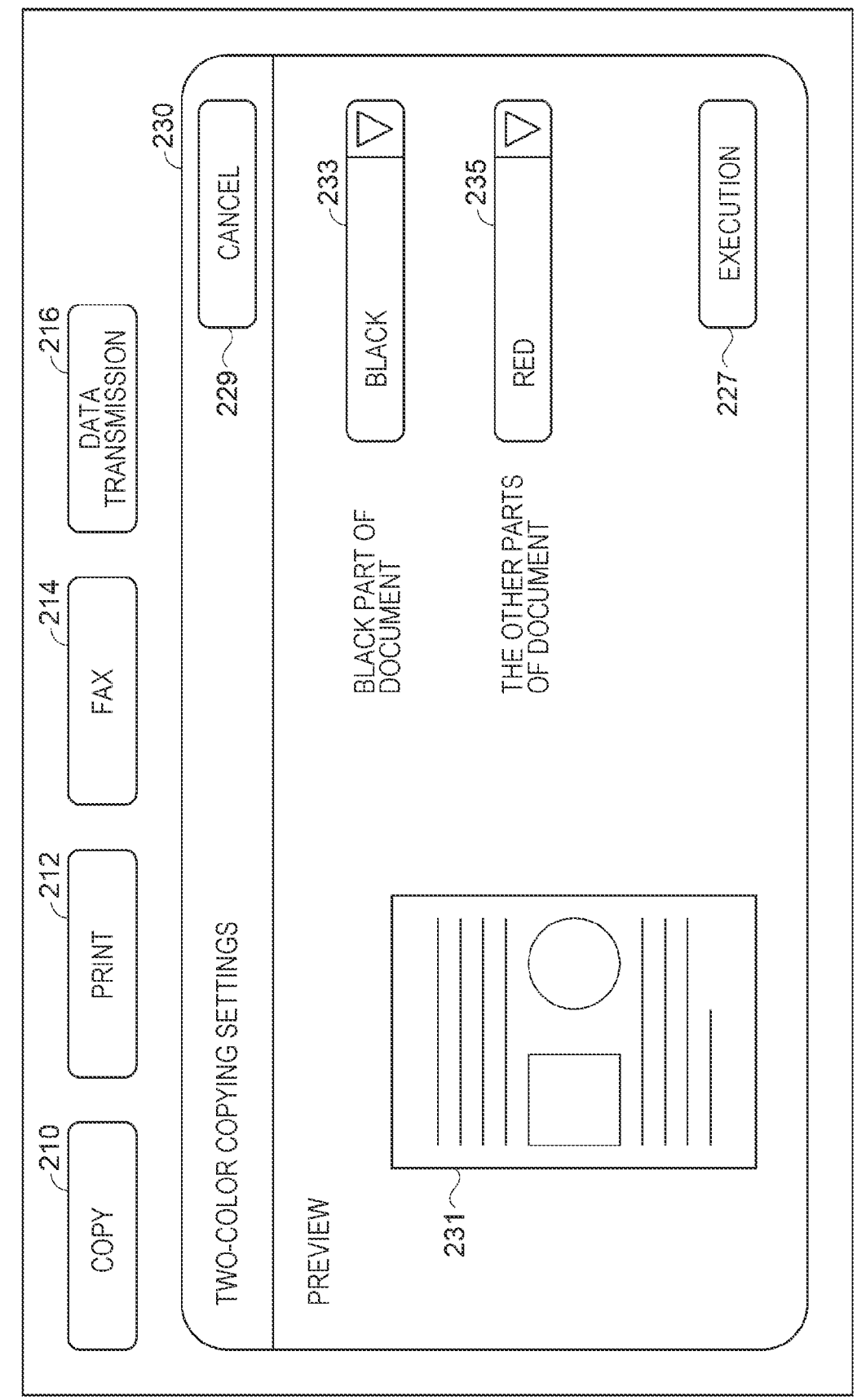
FIG. 5 is a diagram illustrating a two-color copying setting screen.
Figure 6:
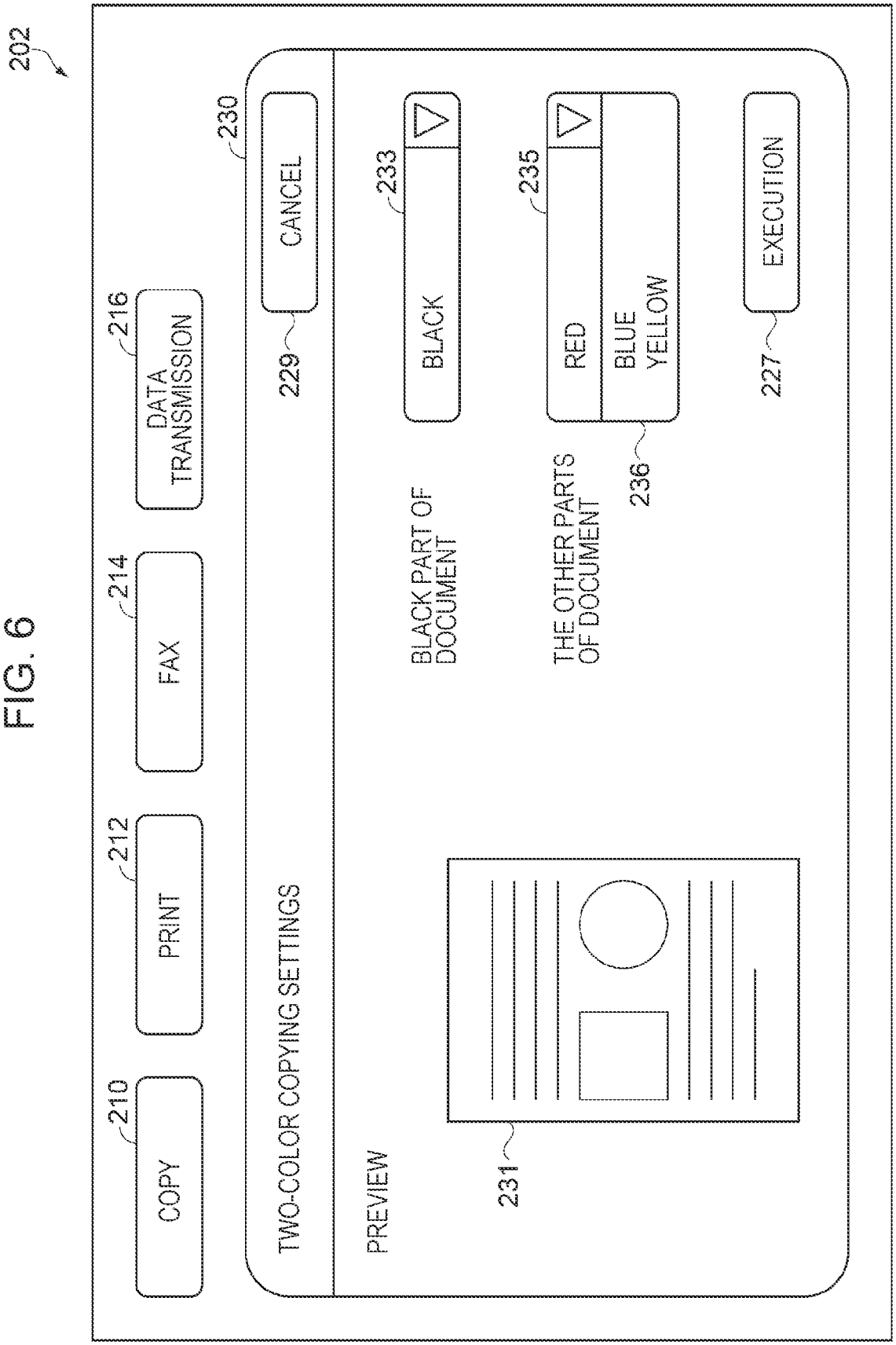
FIG. 6 is a diagram illustrating a two-color copying setting screen displaying a pull-down menu.
Figure 7:
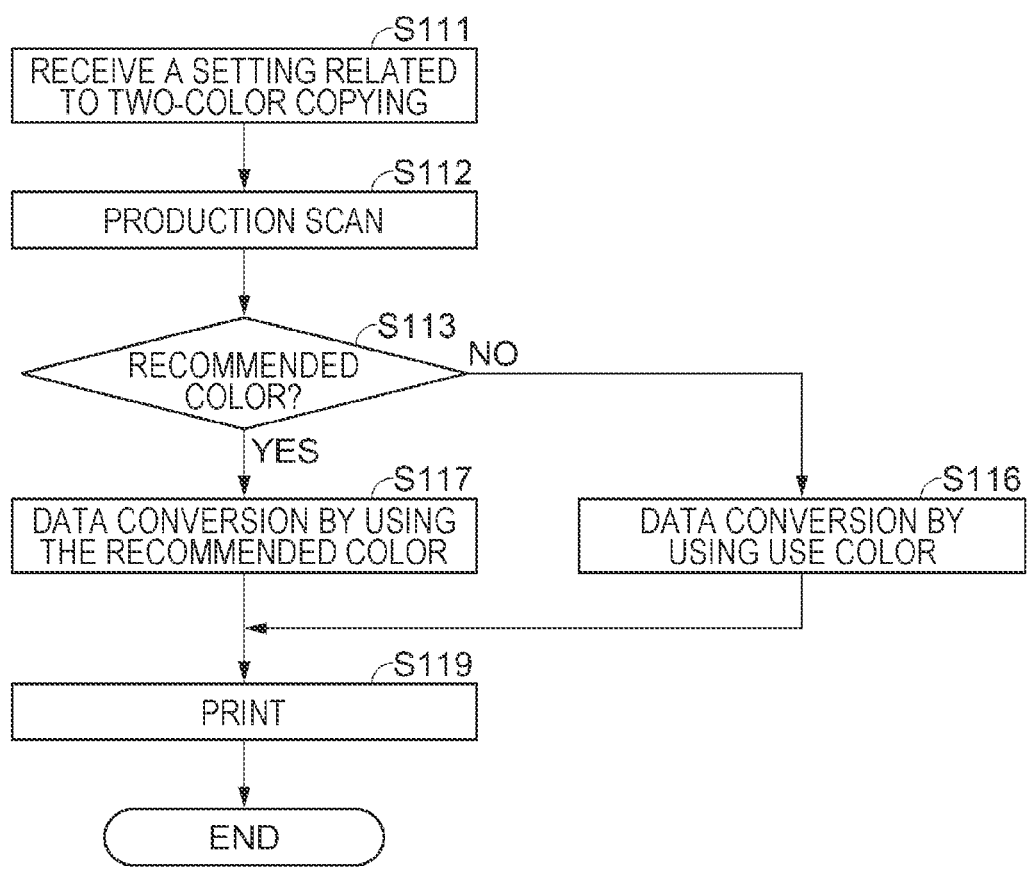
FIG. 7 is a flowchart illustrating the operation of the printer.

The first embodiment illustrates the case in which the user instructs the printer 1 to execute two-color duplication, the display control unit 51 presents one recommended color to the user out of the two colors as an analysis result of the read data. The other color out of the two colors is set in advance as a default setting in which black parts of the document are to be printed in black. However, the display control unit 51 may present two colors to the user as recommended colors as the analysis result of the read data. FIG. 4 and FIG. 7 are flowcharts illustrating the operation of the printer 1 when the user sets two-color duplication as a user instruction. FIG. 5 and FIG. 6 illustrate the two-color copying setting screen 202 displayed on the display 30 when the printer 1 is operated. FIG. 4 illustrates the operation in which after the two-color duplication is set, the two-color copying setting screen 202 is displayed on the display 30. The flowchart illustrated in FIG. 4 is the operation flow executed by the printer 1 when the control unit 50 executes the display control program 45. The control unit 50 corresponds to an example of the print control device. FIG. 7 illustrates the operation in which after the two-color copying setting screen 202 receives input by the user, the printer 1 performs two-color duplication.

When the display control unit 51 receives a copy instruction, the display control unit 51 transmits copy setting screen data for displaying the copy setting screen 201 to the display 30. The copy instruction is transmitted to the control unit 50 via the input/output interface 70 when the copy instruction button 210 or a copy setting icon, not illustrated in the figure, receives input from the user. The control unit 50 transmits the copy instruction to the display control unit 51. The display 30 receives copy setting screen data, displays the copy setting screen 201, and receives input from the user. In a state in which the display 30 displays "two colors" in the color setting field 223 on the copy setting screen 201, when the execution button 227 receives input from the user, the print control unit 57 receives a two-color copying instruction in step S101 as the input from the user.

When the control unit 50 receives a two-color copying instruction, the control unit 50 transmits a read instruction that instructs the reading unit 10 to read a document. The reading unit 10 receives the read instruction, and reads a document mounted on the mounting tray 13 by prescanning in step S103. The prescanning is the processing that reads read data to be analyzed by an analysis unit 53 described later. The prescanning may be performed under a condition different from that of a copy production scan described later or may be performed under the same condition. In order to increase the speed of the processing, the prescanning may be performed by using a reading resolution lower than that of the production scan with a higher reading speed. The reading unit 10 generates read data. The read data may be data corresponding to one document or data corresponding to a plurality of documents. The reading unit 10 transmits the read data to the analysis unit 53. The analysis unit 53 receives the read data.

The analysis unit 53 analyzes the color information included in the read data in step S105. It is possible to use a method, such as an analysis method for obtaining the use ratio of each color included in the read data for each predetermined color, or the like. The analysis unit 53 analyzes the read data and obtains as an analysis result, for example, a blue use ratio of 50%, a red use ratio of 45%, a black use ratio of 4%, and a green use ratio of 1%. The use ratio corresponds to an example of the use frequency of a color. The analysis unit 53 automatically determines a recommended color for performing two-color copying based on the analysis result. When the analysis unit 53 determines a recommended color based on the highest frequently used ratio, the recommended color based on the analysis result described above is blue.

The analysis unit 53 determines a recommended color included in the read data based on the use frequency of the colors included in the read data. Since the printer 1 presents a recommended color based on the use frequency of colors, the possibility increases for the user to obtain a two-color printed material that gives little discomfort to the user.

The way of determining a recommended color is not limited to this. The analysis unit 53 may determines a recommended color based on a color having the lowest use ratio. The analysis unit 53 may obtain not only the use ratio but also the other analysis values as a result of the analysis. The analysis unit 53 may separate the read data into a text part including text and an image part including an image, such as figures, or the like, and may analyze the color information used in the text part. When the colors used in the text part are blue and black, the analysis unit 53 determines a recommended color as blue. It is possible to suitably use an analysis method that is able to perform determination as long as the method determines a recommended color. For example, by performing machine learning using a scanned image and the settings at the time of the two-color copying, and based on the learning result, a recommended color may be determined. After that, the analysis unit 53 transmits information on the determined recommended color to the display control unit 51.

After the analysis unit 53 analyzes the color components included in the read data, the analysis unit 53 may obtain the use ratio for each color component excluding white and black. The analysis unit 53 analyzes the read data and calculates, for example, a black use ratio of 50%, a white use ratio of 40%, a red use ratio of 5%, a blue use ratio of 4%, and a green use ratio of 1% as a result of the analysis. The use ratio of each color excluding white and black becomes 5% for the red use ratio, 4% for the blue use ratio, and 1% for the green use ratio. The analysis unit 53 determines a recommended color based on the red use ratio, the blue use ratio, and the green use ratio. When the analysis unit 53 determines a recommended color based on a color having the highest use ratio, the recommended color based on the analysis result described above is red.

The analysis unit 53 determines a color having the highest use ratio out of the colors included in the read data with the exception of white and black as a recommended color. For example, at the time of two-color copying, when as one color out of the two colors, black is set as a predetermined default setting, it is easy to determine a color other than black as a recommended color. Also, after the analysis unit 53 performs background removal processing on the read data, the analysis unit 53 may analyze the color components. By performing background removal processing by the analysis unit 53, it is possible to increase the analysis accuracy at the time of analyzing the color components and the use ratio of a color.

The analysis unit 53 determines a recommended color based on the use ratio of a color included in the read data that has undergone the background removal processing. It is possible for the analysis unit 53 to obtain an analysis result having a high analysis accuracy by analyzing the read data that has undergone the background removal processing.

After the prescanning has been completed, the display control unit 51 obtains information on a recommended color, and automatically generates the two-color copying setting screen 202 in step S107. FIG. 5 illustrates the two-color copying setting screen 202. The two-color copying setting screen 202 is a setting screen to be displayed after the prescanning is executed and is an example of the color detailed setting screen. The two-color copying setting screen 202 displays a copy instruction button 210, a print instruction button 212, a fax instruction button 214, a data transmission instruction button 216, and a two-color copying setting list 230. The two-color copying setting list 230 displays a preview image 231, a black part setting field 233, the other part setting field 235, an execution button 227, and a cancel button 229. The two-color copying setting screen 202 corresponds to an example of the setting screen related to two-color duplication.

The copy instruction button 210, the print instruction button 212, the fax instruction button 214, the data transmission instruction button 216, the execution button 227, and the cancel button 229 are individually the same as those buttons displayed on the copy setting screen 201 displayed in FIG. 3.

The preview image 231 is a thumbnail image based on the read data read by the reading unit 10. The preview image 231 may be a full color image, or may not be a full color image. When two-color copying is instructed in step S101, the preview image 231 is displayed by using a two-color image. The two-color image is an image to be displayed by using black and a recommended color.

The black part setting field 233 displays a use color to be used when the black part of a document is printed. The black part setting field 233 displays a specified color input by the user as a use color. The black part setting field 233 displays predetermined "black" as a default setting. It is possible for the black part setting field 233 to specify color other than black as a use color by the user input. It may be possible for the black part setting field 233 not to set a color other than black.

The other part setting field 235 displays a use color to be used when the other part other than black of a document is printed. The other part setting field 235 displays a recommended color as the use color determined by the analysis unit 53 as the default setting. It is possible for the other part setting field 235 to display the specified color input by the user as a use color instead of a recommended color.

The execution button 227 on the two-color copying setting screen 202 illustrated in FIG. 5 receives input from a user. When the execution button 227 receives an input from a user, an instruction of two-color copying including an execution instruction of production scan is received as an instruction from the user. The print control unit 57 receives various settings made on the two-color copying setting screen 202 illustrated in FIG. 5. The two-color copying setting screen 202 illustrated in FIG. 5 displays "black" in the black part setting field 233 and displays "red" in the other part setting field 235. In the various settings to be received by the print control unit 57 based on the two-color copying setting screen 202 illustrated in FIG. 5, the settings are such that the black part of the document is printed in black and the other parts of the document are printed in red.

The cancel button 229 on the two-color copying setting screen 202 illustrated in FIG. 5 receives input from a user. When the cancel button 229 receives input from the user, the display control unit 51 receives a hide instruction that hides the two-color copying setting list 230 and an instruction to cancel the two-color copying including execution of the production scan as an instruction from the user.

FIG. 6 illustrates the two-color copying setting screen 202 that displays a pull-down menu 236 of the other part setting field 235. The pull-down menu 236 displays the choices of a use color to be used when the part other than black of the document is printed. The pull-down menu 236 in FIG. 6 displays blue and yellow as choices of use colors. The choices displayed in the pull-down menu 236 may include three colors or more. When the pull-down menu 236 is displayed, the other part setting field 235 displays red, which is a recommended color. The other part setting field 235 displays a recommended color preferentially over the other colors. When the user specifies one color from the choices displayed in the pull-down menu 236, the other part setting field 235 displays the specified color as a use color instead of the recommended color.

When the user specifies one color from the choices displayed in the pull-down menu 236, the display control unit 51 displays the preview image 231 using the specified color on the two-color copying setting screen 202. When the user has not specified one color from the choices, the display control unit 51 displays the preview image 231 using the recommended color on the two-color copying setting screen 202. The display control unit 51 changes the preview image 231 in accordance with the specified result by the user.

The display control unit 51 displays the two-color copying preview image 231 using the specified color. It is possible for the user to view the preview image 231 so as to estimate the state of the printed material to be printed by the print unit 20.

The display control unit 51 generates a two-color copying setting screen 202 that displays the recommended color determined by the analysis unit 53 as a default setting. The display control unit 51 causes the user to specify a color with the recommendation of a recommended color. After the display control unit 51 generates the two-color copying setting screen 202, the display control unit 51 generates two-color copying setting screen data for displaying the two-color copying setting screen 202 in step S109 and transmits the data to the display 30. The two-color copying setting screen 202 that displays a recommended color corresponds to an example of the setting screen including one recommended color. The two-color copying setting screen data corresponds to an example of the setting screen data.

The display control unit 51 determine the default setting to be a recommended color to recommend a recommended color. It is possible for the user to view the two-color copying setting screen 202 so as to easily determine a recommended color. Also, when the user executes the two-color copying using a recommended color, it is possible to reduce the time and effort for the setting.

The printer 1 causes the display 30 to display the two-color copying setting screen 202 related to the two-color duplication and performs two-color copying. The printer 1 includes the reading unit 10 that reads a document to generate read data, the analysis unit 53 that analyzes the read data generated by the reading unit 10, the display control unit 51 that generates the two-color copying setting screen 202, and the print unit 20 that performs printing based on the read data. The display control unit 51 generates the two-color copying setting screen data that causes the display 30 to display the two-color copying setting screen 202 including one recommended color determined based on the analysis result obtained by the analysis unit 53. Since the printer 1 presents a recommended color to the user based on the read data, it is possible for the user to omit the selection work of a color at two-color copying time, and thus it is possible for the user to reduce time and effort.

The display control program 45 is a program to be executed by the processor 27 of the control unit 50 including the display control unit 51 that generates the two-color copying setting screen 202 related to the two-color copying of the printer 1. The display control program 45 causes the processor 27 to read a document to obtain read data, to analyze the obtained read data, and to generate the setting screen data for displaying the two-color copying setting screen 202 including a recommended color determined based on the analysis result on the display 30.

In the state in which the two-color copying setting screen 202 displays a color in the black part setting field 233, and the other part setting field 235, the execution button 227 receives input from the user. When the execution button 227 receives input from the user, the input/output interface 70 obtains the setting related to the two-color copying from the display 30 in step S111 in FIG. 7. The input/output interface 70 corresponds to an example of the acquisition section. The settings related to the two-color copying are the use color settings including the use color to be used when printing the black part of the document and the use color to be used when the part other than black of a document is printed. The use color to be used when printing the part other than black of a document corresponds to an example of the first use color. The use color to be used when printing a part other than black of the document corresponds to an example of the second use color. The input/output interface 70 transmits the use color setting to the data processing unit 55.

After the input/output interface 70 receives a use color setting, the control unit 50 causes the reading unit 10 to perform production scan of a document in step S112 based on the instruction from the user. The reading unit 10 reads a document to generate read data. The reading conditions of the production scan may be the same as the reading conditions of the prescanning or may be different. The production scan may have a lower transport speed of a document than the prescan and a higher reading resolution. When the printer 1 performs two-color copying by using the read data generated by the prescan, the printer 1 does not have to perform production scan.

The data processing unit 55 determines whether or not a use color included in the color setting is a recommended color in step S113. When the data processing unit 55 determines that the use color included in the use color setting is a recommended color, the processing proceeds to step S117. When the data processing unit 55 determines that the use color included in the use color setting is not a recommended color, the processing proceeds to step S116.

In step S117, the data processing unit 55 converts the read data to print data. The print data corresponds to an example of the conversion data. The data processing unit 55 converts the read data to print data for performing two-color printing using the recommended color. When in the black part setting field 233 on the two-color copying setting screen 202 in FIG. 5, black is specified as a use color, and in the other part setting field 235, red, which is the recommendation color, is specified as a use color, the data processing unit 55 converts the read data to the print data for printing a printed material including the two colors, black and red. After the data processing unit 55 converts the read data to print data, the print control unit 57 transmits the print data to the print unit 20 in step S119 and causes the print unit 20 to perform printing based on the print data. The print unit 20 performs two-color printing based on the print data. The printer 1 copies the printed material including black and a recommended color based on the read data.

In step S116, the data processing unit 55 converts the read data to print data. The data processing unit 55 converts the read data to print data for performing two-color printing by using the use color specified by the user. When black is specified as the use color in the black part setting field 233 on the two-color copying setting screen 202 in FIG. 5, and blue, which is not a recommended color of the other part setting field 235 as the use color, the data processing unit 55 converts the read data to print data for printing a printed material including the two colors, black and blue. After the data processing unit 55 converts the read data to print data, the print control unit 57 transmits the print data to the print unit 20 in step S119 and causes the print unit 20 to perform printing based on the print data. The print unit 20 performs two-color printing based on the print data. The printer 1 copies a printed material including black and the use color based on the read data.

As described above, the printer 1 includes the reading unit 10 that scans a document and generates read data, the analysis unit 53 that automatically determines a recommended color in accordance with a situation, the display control unit 51 that causes the user to specify a color with the recommendation of a recommended color, and the print unit 20 that performs two-color copying on the medium by using the color specified by the display control unit. Since the printer 1 presents a recommended color to the user based on the read data, it is possible for the user to omit the selection work of a color at two-color copying and to reduce time and effort. Also, the user gives an instruction to print by using a recommended color recommended by the printer 1 so as to obtain a two-color copying printed material corresponding to the read data.

Second Embodiment

In a second embodiment, the analysis unit 53 determines a recommended color based to the storage amount of each ink stored in the printer 1.

The printing mechanism 23 in FIG. 1 includes a cyan ink tank, not illustrated in the figure, which stores cyan ink, a magenta ink tank that stores magenta ink, a yellow ink tank that stores yellow ink, and a black ink tank that stores black ink. Each ink tank includes a sensor, not illustrated in the figure, which detects the ink amount. The print unit 20 detects the storage amount of the ink stored in each ink tank, and transmits the storage amount to the storage device 40 in FIG. 1. The storage device 40 stores the transmitted storage amount of each ink.

The print control unit 57 obtains the ink storage amount stored in each ink tank of the print unit 20 from the storage device 40. The print control unit 57 obtains the cyan ink storage amount, the magenta ink storage amount, the yellow ink storage amount, and the black ink storage amount. The print control unit 57 calculates each difference of the cyan ink storage amount, the magenta ink storage amount, and the yellow ink storage amount. The print control unit 57 may calculate the difference of each ink storage amount including the black ink storage amount. The print control unit 57 outputs the calculated calculation result to the analysis unit 53. The calculation results are an ink color having the largest ink storage amount, an ink color having the smallest ink storage amount, and an ink color having the lowest use frequency, and the like. The print control unit 57 corresponds to an example of the calculation section.

The analysis unit 53 obtains calculation results from the print control unit 57 and determines a recommended color based on the obtained calculation results. The analysis unit 53 determines an ink color having the largest ink storage amount as a recommended color as an example. The analysis unit 53 transmits the determined recommended color information to the display control unit 51. The display control unit 51 obtains the recommended color information and generates the two-color copying setting screen 202. The display control unit 51 generates two-color copying setting screen data for displaying the two-color copying setting screen 202 and transmits the data to the display 30.

Figure 8:
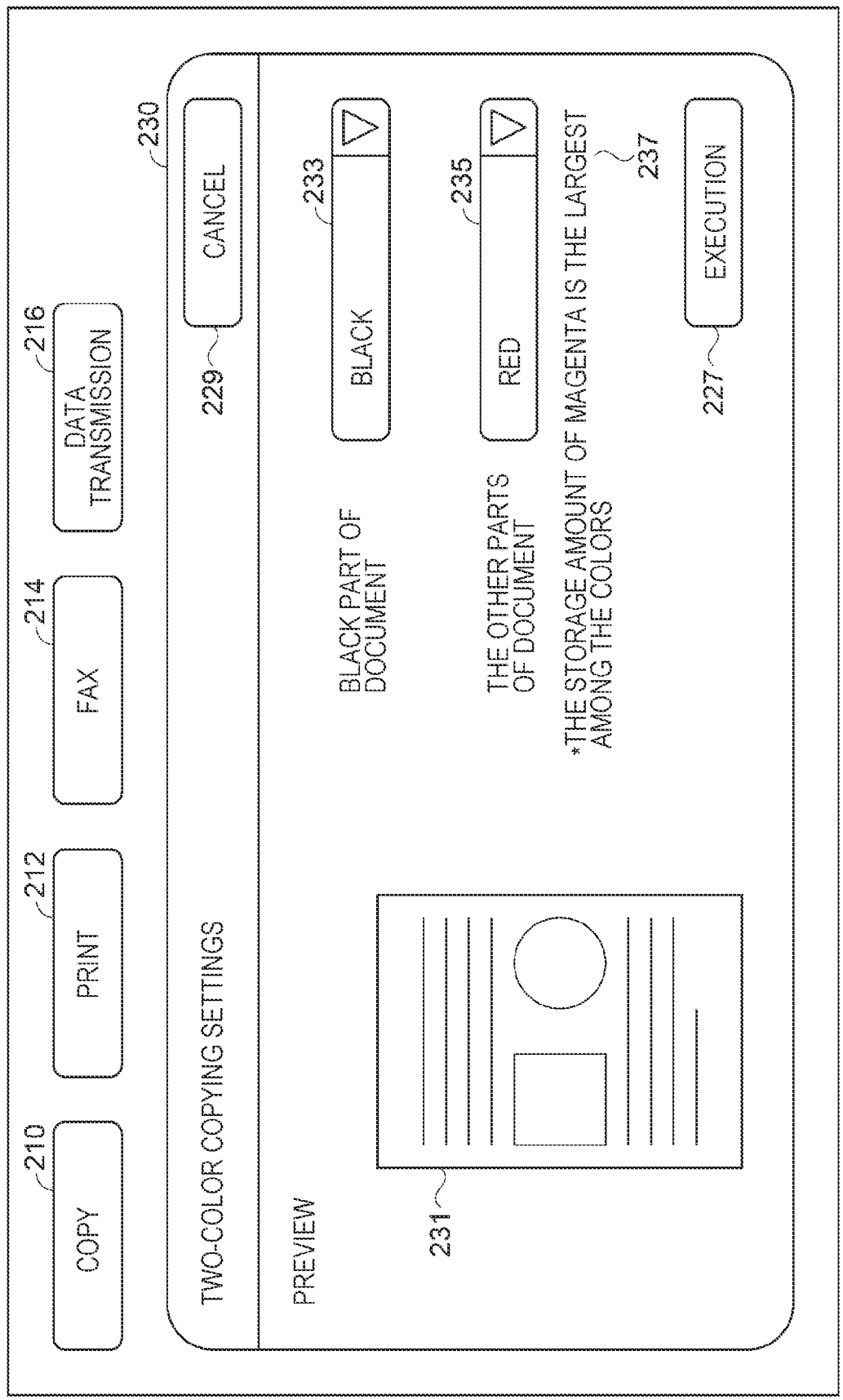
FIG. 8 is a diagram illustrating a two-color copying setting screen.

FIG. 8 illustrates the two-color copying setting screen 202 according to the second embodiment. The two-color copying setting screen 202 according to the second embodiment is the same as the two-color copying setting screen 202 according to the first embodiment with the exception of displaying a message 237.

The message 237 indicates the cause that a recommended color displayed in the other part setting field 235 is recommended by the analysis unit 53. The message 237 in FIG. 8 states "the storage amount of magenta is the largest among the colors". The message 237 in FIG. 8 indicates that the storage amount of magenta ink is larger than the cyan ink storage amount and the yellow ink storage amount. Red, which is a recommended color displayed in the other part setting field 235 is the color having a large use amount of magenta ink, and the analysis unit 53 determines red as a recommended color. It is possible for the user to determine whether or not the determination of a recommended color is suitable by confirming the contents described in the message 237.

As described in the second embodiment, the analysis unit 53 determines a recommended color based on the remaining amount of ink of the print unit 20. Since the printer 1 presents a recommended color based on the storage amount of each ink, it is possible for the user to perform two-color duplication in accordance with the situation of the printer 1.

In the second embodiment, the analysis unit 53 determines an ink color having the largest ink storage amount as a recommended color. However, the present disclosure is not limited to this. The analysis unit 53 may determine an ink color having the smallest ink storage amount as a recommended color in order to encourage replenishment. The analysis unit 53 may determine a recommended color by using the analysis result of the read data according to the first embodiment in addition to the storage amount of each ink.

The analysis unit 53 may determine a recommended color by comparing the storage amount of each ink and the stored threshold value. The threshold value of each ink is stored in the storage device 40 in advance. The analysis unit 53 analyzes whether or not the storage amount of each ink is larger than the threshold value of each ink. For example, it is assumed that the magenta ink storage amount is equal to or larger than the threshold value of magenta ink, the cyan ink storage amount is smaller than the threshold value of cyan ink, and the yellow ink storage amount of yellow ink is smaller than the threshold value. At this time, the analysis unit 53 determines the color of magenta ink having the storage amount larger than the threshold value of magenta ink as a recommended color.

The analysis unit 53 determines the color of ink having the storage amount equal to or larger than the threshold value as a recommended color. Since the printer 1 presents a recommended color based on the storage amount of each ink, it is possible for the user to perform two-color copying in accordance with the situation of the printer 1.

Third Embodiment

Figure 9:
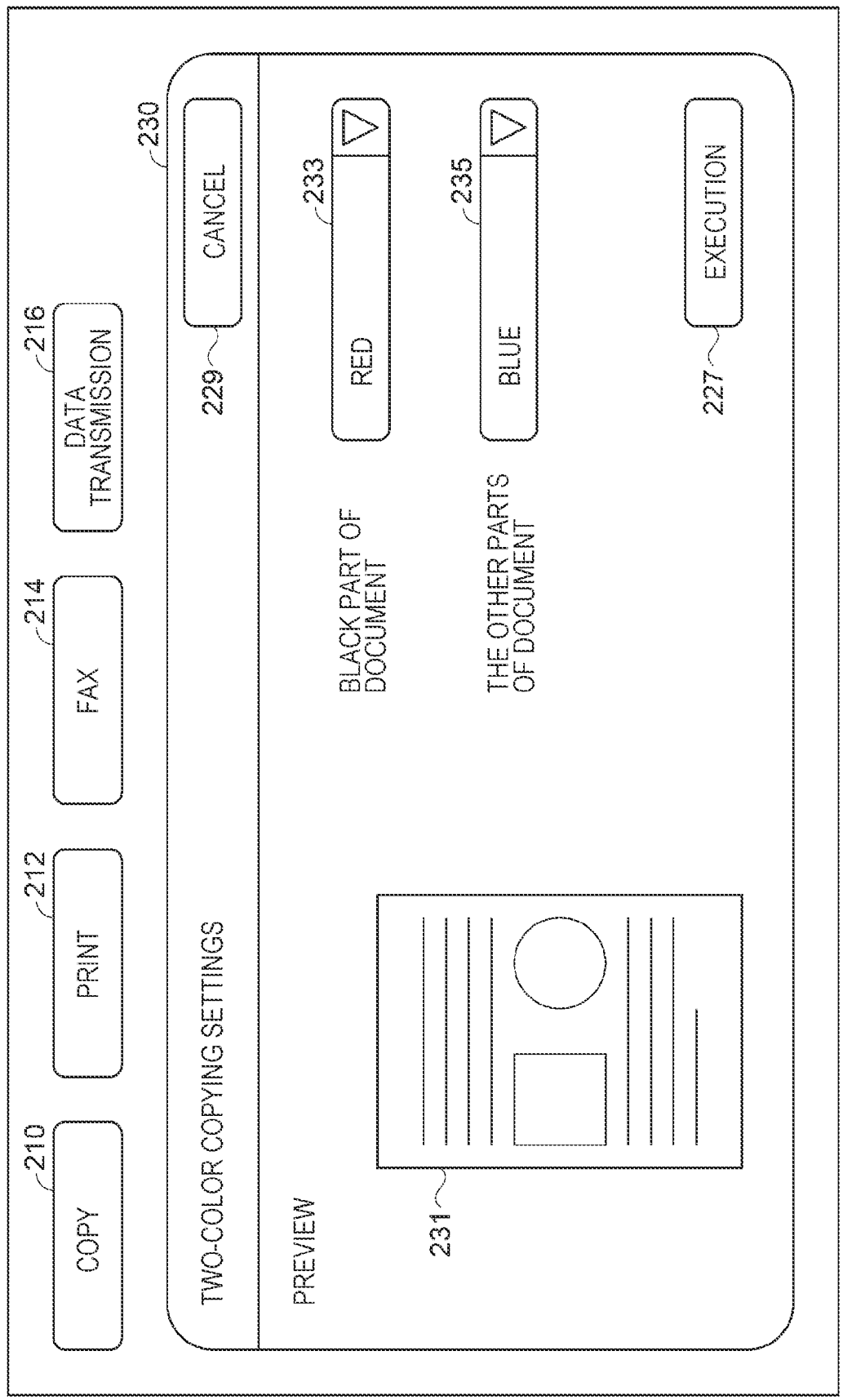
FIG. 9 is a diagram illustrating a two-color copying setting screen.

A third embodiment indicates the case in which black specified by the black part setting field 233 according to the first embodiment is specified as the other color. FIG. 9 illustrates the two-color copying setting screen 202 according to the third embodiment. In the two-color copying setting screen 202 illustrated in FIG. 9 indicates the case in which red is specified for the black part setting field 233 by the user on the two-color copying setting screen 202 illustrated in FIG. 5.

On the two-color copying setting screen 202 illustrated in FIG. 5, red is displayed as a recommended color in the other part setting field 235. When red, which is a recommended color, is specified in the black part setting field 233 by the user, the display control unit 51 displays the second recommended color in the other part setting field 235. For example, the analysis unit 53 analyzes the read data and calculates a black use ratio of 90%, a red use ratio of 5%, a blue use ratio of 4%, and a green use ratio of 1% as an analysis result. At this time, the analysis unit 53 determines red as the first recommended color and blue as the second recommended color based on the use ratio. The second recommended color corresponds to an example of the second color. When red, which is the first recommended color, is specified in the black part setting field 233 by the user, the display control unit 51 converts the color displayed in the other part setting field 235 from the first recommended color to the second recommended color to display. In the example described above, since the second recommended color is blue, the display control unit 51 changes the color displayed in the other part setting field 235 from red to blue as illustrated in FIG. 9. The two-color copying setting screen 202 illustrated in FIG. 9 indicates the state in which the color displayed in the other part setting field 235 has been changed to blue.

As illustrated in the third embodiment, the analysis unit 53 determines a second recommended color based on the use frequency of color included in the read data, and the display control unit 51 recommends that the first color be changed to the second color. For example, the display control unit 51 recommends that the ink having the largest storage amount be changed to the ink having the second largest storage amount so as to increase the possibility of preferentially using the ink having a large storage amount.

Fourth Embodiment

Figure 10:
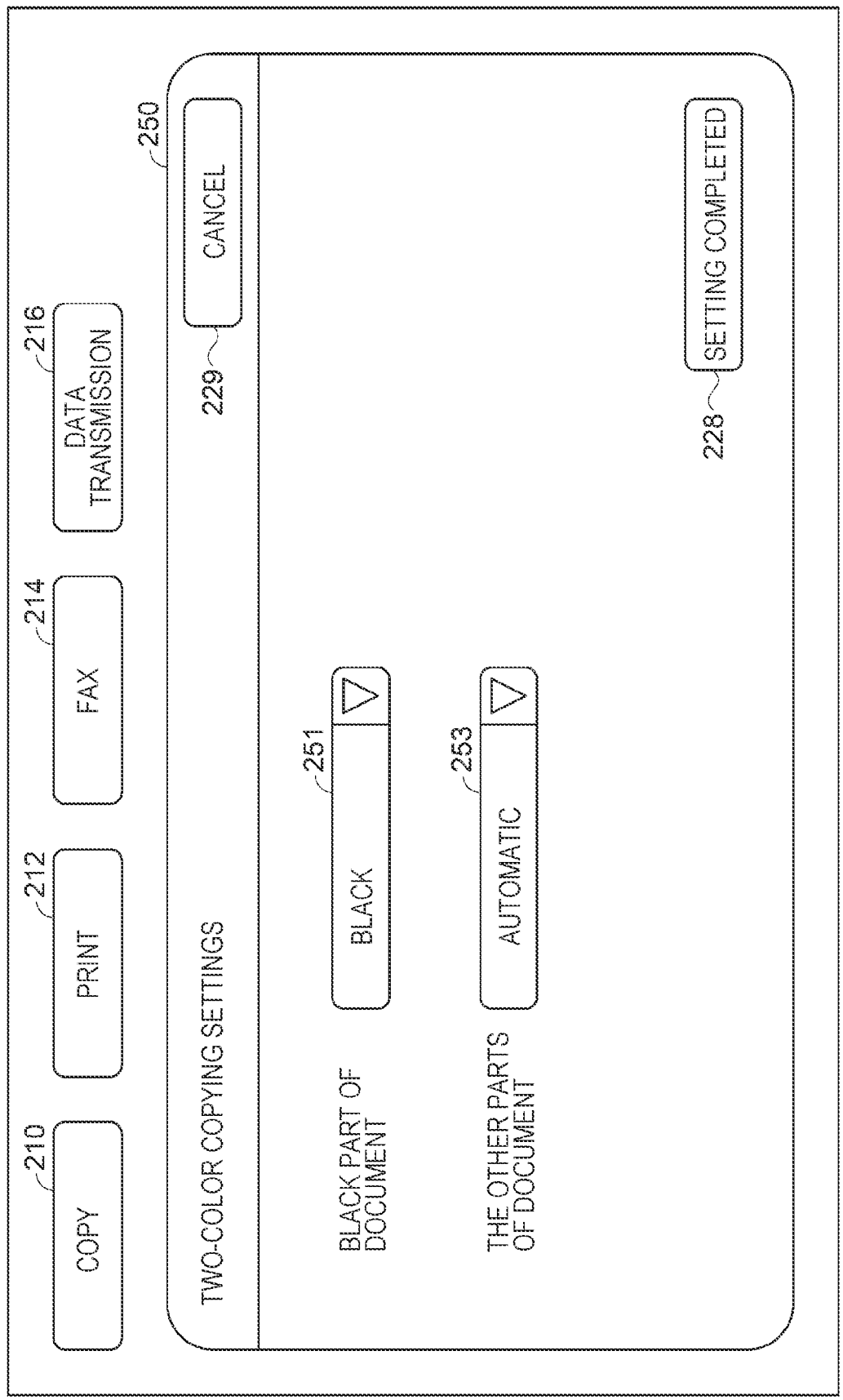
FIG. 10 is a diagram illustrating a two-color copying standard setting screen.

A fourth embodiment indicates the case in which the use color for using two-color copying is set in advance, and two-color copying is performed based on the set use color. FIG. 10 illustrates a two-color copying standard setting screen 205 to be used when the use color to be used for two-color copying is set in advance. When the color detailed setting button 224 illustrated in FIG. 3 receives input from the user, the two-color copying standard setting screen 205 is displayed on the display 30. The two-color copying standard setting screen 205 is an example of the color detailed setting screen. The two-color copying standard setting screen 205 corresponds to an example of the setting screen. The display data for displaying the two-color copying standard setting screen 205 corresponds to an example of the setting screen data.

The two-color copying standard setting screen 205 displays the copy instruction button 210, the print instruction button 212, the fax instruction button 214, the data transmission instruction button 216, and the two-color copying standard setting list 250. The two-color copying standard setting list 250 displays a black part standard setting field 251, the other part standard setting field 253, the setting completion button 228, and the cancel button 229.

The copy instruction button 210, the print instruction button 212, the fax instruction button 214, the data transmission instruction button 216, and the cancel button 229 are the same as the corresponding buttons displayed on the two-color copying setting screen 202 in FIG. 5.

The black part standard setting field 251 displays the use color to be used when black part of the document is printed. The black part standard setting field 251 displays the specified color input by the user as a use color. The black part standard setting field 251 displays a predetermined "black" as a default setting. It is possible for the user to specify the black part standard setting field 251 as a color other than black as a use color. The black part standard setting field 251 may set a color other than black as impossible.

The other part standard setting field 253 displays the use color to be used when the part other than black of the document is printed. The other part standard setting field 253 displays "automatic" as a default setting. "Automatic" indicates a recommended color. When "automatic" is set as the use color, the analysis unit 53 determines a recommended color to be used as the use color when the part other than black of the document is printed. It is possible for the other part standard setting field 253 to change the specified color input by the user to a recommended color as the use color.

The setting completion button 228 receives input from the user. When the setting completion button 228 receives input from the user, the print control unit 57 receives various settings set on the two-color copying standard setting screen 205 as an instruction from the user. After the setting completion button 228 receives input from the user, the display control unit 51 causes the display 30 to display the copy setting screen 201.

The cancel button 229 illustrated in FIG. 10 receives input from the user. When the cancel button 229 receives input from the user, the display control unit 51 receives a hide instruction that hides the two-color copying standard setting list 250 as an instruction from the user and a cancel instruction that cancels the two-color copying standard setting. After the cancel button 229 receives input from the user, the display control unit 51 causes the display 30 to display the copy setting screen 201.

On the two-color copying standard setting screen 205 in FIG. 10, when black is displayed in the black part standard setting field 251, and "automatic" is displayed in the other part standard setting field 253, the setting completion button 228 receives input from the user. When the setting completion button 228 receives input from the user, the input/output interface 70 obtains a standard setting related to two-color copying from the display 30. The standard setting related to two-color copying is the use color setting when two-color copying is performed. In the standard setting related to two-color copying corresponding to the contents displayed on the two-color copying standard setting screen 205 in FIG. 10, black is determined as the use color of the black part of the document, and the use color other than black of the document is determined as a recommendation color. The input/output interface 70 transmits the obtained standard setting related to the two-color copying to the storage device 40. The storage device 40 stores the standard setting related to two-color copying.

FIG. 11 is the operation flowchart of the printer 1 when the storage device 40 stores the standard setting related to two-color copying.

After the storage device 40 stores a standard setting related to two-color copying, the control unit 50 receives an execution instruction of two-color copying as an instruction from the user. When the control unit 50 receives the execution instruction of two-color copying, the control unit 50 causes the reading unit 10 to read the document in step S201 and to generate read data.

The reading unit 10 transmits the generated read data to the analysis unit 53. The analysis unit 53 analyzes the received read data in step S203. As an example, the analysis unit 53 analyzes the use frequency of each color included in the read data. The analysis unit 53 determines a recommended color of ink to be used at the time of printing the part other than black of the document based on the analyzed use frequency in step S205. The analysis unit 53 transmits information on the recommended color determined as the read data to the data processing unit 55.

The data processing unit 55 obtains information on the read data and a recommended color. The data processing unit 55 reads the standard setting related to two-color copying stored in the storage device 40. The use color to be used for printing the black part of the document related to the two-color copying included in the standard setting related to the two-color copying is black. The use color to be used for printing the part other than black included in the standard setting related to two-color copying is a recommendation color. The data processing unit 55 converts the read data to print data based on the information on a recommended color and the standard setting related to two-color copying in step S207. The print data is data for printing the black part of the document by using black and the part other than black of the document by using a recommended color. The data processing unit 55 transmits the print data to the print control unit 57. The print control unit 57 causes the print unit 20 to perform printing based on the print data in step S209. The print unit 20 performs two-color printing of a printed material printed by using black and a recommended color.

As illustrated in the fourth embodiment, the printer 1 performs two-color duplication. The printer 1 includes the reading unit 10 that reads a document and generates read data, the analysis unit 53 that analyzes the read data generated by the reading unit 10, the data processing unit 55 that converts the read data to print data, and the print unit 20 that prints the print data. The print data is the data that causes the print unit 20 to perform printing by using one recommended color determined based on the analysis result analyzed by the analysis unit 53, and the print unit 20 performs two-color printing based on the print data. It is possible for the user to obtain two-color printed material without selecting colors.

The functions of the control unit 50 may be realized by one or a plurality of processors or a semiconductor chip. For example, the control unit 50 may further include a sub-processing apparatus (co-processor), such as a SoC (system on chip), an MCU (micro control unit), an FPGA (field programmable gate array), or the like. The control unit 50 may perform various control by working together both the CPU and the sub-processing apparatus, or by selectively using one of them. Also, the analysis unit 53 or the data processing unit 55 may be included in one printer, or may be included in a server or the like, which is different from the printer, and the functions described above may be realized by working together with the printer.

It is possible to combine the embodiments. The processing unit of the flowcharts in FIG. 4, FIG. 7, and FIG. 11 is divided in accordance with the main processing contents in order to facilitate understanding of the processing by the printer 1. The present disclosure is not limited by the way of dividing the processing unit and the names. The processing of each step may be further divided into multiple processing units in accordance with the processing contents. One processing unit may be divided so as to include further processing. The sequence of the processing may be suitably replaced in the range that gives no trouble. For example, the prescanning may be started in accordance with the setting of a document, or an instruction from the user after a document is set. Also, by performing prescanning that generates data to be used for analysis with a highest image quality of the reading unit 10, production scan that generates the data to be used for printing may be served, or prescanning may be performed with a lower image quality than the highest image quality of the reading unit 10, and the production scan may be performed again.

The operation flow of the printer 1 according to the present embodiment indicates the case in which the processor 27 of the printer 1 executes the display control program 45 so as to realize the processing. However, it is possible that the display control program 45 executed by the processor 27 for realizing the operation flow may be recorded in a computer-readable recording medium, or the display control program 45 may be transmitted as a transmission medium. It is possible for the recording medium to use a magnetic or optical recording medium, or a semiconductor memory device. The recording mediums include a flexible disk, an HDD, a CD-ROM (compact disk read-only memory), a DVD (Digital Versatile Disk), a Blu-ray (registered trademark) disc, a magneto-optical disk, a flash memory, a portable type, such as a card-type recording medium, or a fixed type recording medium, or the like. The recording medium may be a nonvolatile storage device, a RAM, a ROM, an HDD included in the printer 1, or the like. Also, it is possible for the user to specify the colors of two-color copying. However, it may be possible for the user not to specify the colors. In that case, by instructing the start of two-color copying by the user, two-color copying is automatically started by using the colors analyzed by the analysis unit 53.

What is claimed is:

1. A printing system comprising:
a scanner configured to scan a document to generate a document image;
a processor including
a determination section configured to automatically determine a first color for the document image, in accordance with a situation, and
a specification section configured to present the first color, which has been automatically determined, to a user as a recommendation color, and cause the user to specify a color in response to presentation of recommendation of the first color; and
a print section configured to perform two-color copying on a medium by using the color specified by the specification section.

2. The printing system according to claim 1, wherein
the determination section determines the first color included in the document image based on a use frequency of a color included in the document image.

3. The printing system according to claim 2, wherein
the determination section determines as the first color a color having the use frequency of a highest value with an exception of white and black among colors included in the document image.

4. The printing system according to claim 2, wherein
the determination section determines the first color based on the use frequency of a color included in the document image subjected to background removal processing.

5. The printing system according to claim 1, wherein
the specification section causes a preview of the two-color copying using the color specified by the specification section to be displayed.

6. The printing system according to claim 1, wherein
the specification section determines a default setting to be the first color to recommend the first color.

7. The printing system according to claim 1, wherein
the determination section determines the first color based on a remaining amount of a color material included in the print section.

8. The printing system according to claim 7, wherein
the determination section determines as the first color a color of the color material having the remaining amount equal to or larger than a threshold value.

9. A printing system comprising:
a scanner configured to scan a document to generate a document image;
a processor including
a determination section configured to automatically determine a first color in accordance with a situation, and
a specification section configured to cause a user to specify a color with recommendation of the first color; and
a print section configured to perform two-color copying on a medium by using the color specified by the specification section, wherein
the determination section determines a second color based on a use frequency of a color included in the document image, and
the specification section recommends that the first color be converted to the second color.

* * * * *